United States Patent

Nitzsche

[11] Patent Number: 5,906,467
[45] Date of Patent: May 25, 1999

[54] HAY BALE HANDLING DEVICE

[76] Inventor: Merlin J. Nitzsche, 1059 Hwy. 51, Wisner, Nebr. 68791

[21] Appl. No.: 08/992,845

[22] Filed: Dec. 18, 1997

Related U.S. Application Data

[60] Provisional application No. 60/033,498, Dec. 19, 1996.

[51] Int. Cl.$^6$ ........................................................ B60P 1/28
[52] U.S. Cl. ................................................ 414/24.5; 414/480
[58] Field of Search ................................ 414/24.5, 24.6, 414/111, 480

[56] References Cited

U.S. PATENT DOCUMENTS

| | | | |
|---|---|---|---|
| 4,103,794 | 8/1978 | Shaw | 414/24.5 |
| 4,204,789 | 5/1980 | Parks | 414/24.5 |
| 4,204,790 | 5/1980 | Baxter | 414/24.5 |
| 4,248,560 | 2/1981 | Roose | 414/24.5 |
| 4,248,561 | 2/1981 | Graves | 414/24.5 |
| 4,266,898 | 5/1981 | Jacobsen | 414/24.5 |
| 4,498,829 | 2/1985 | Spikes | 414/24.5 |
| 4,930,964 | 6/1990 | Doan | 414/24.5 |
| 4,971,504 | 11/1990 | Klompien | 414/111 |
| 5,013,202 | 5/1991 | Love . | |
| 5,071,304 | 12/1991 | Godfrey | 414/111 |
| 5,333,981 | 8/1994 | Provonost et al. | 414/245 |

FOREIGN PATENT DOCUMENTS 8607234  12/1986  WIPO ................................ 414/24.5

Primary Examiner—David A. Bucci
Assistant Examiner—Gregory A. Morse
Attorney, Agent, or Firm—William H. Holt

[57] ABSTRACT

A device for retrieving hay bales from a field, transporting the bales, and depositing the bales in a vertical stack. The device has a wheeled chassis and a bed inclinable to three possible positions. The bed comprises a vee shaped trough having a stop at the rear of the bed and a pair of powered jaws pivotally hinged to the front of the bed. The bed is inclined to a retrieval position with the front end contacting the ground, for retrieving bales by scooping action. In this position, the jaws can be opened to better engage a bale, and closed to urge the bale upwardly onto the bed. The bale is transported with the bed in a second, horizontal position parallel to the ground. The bed can be inclined to a third, vertical position for depositing the bale. A number of bales can be retrieved, axially aligned by the vee shaped bed, and deposited as a stack. The device has a draw bar having apparatus for towing the device directly behind a draft vehicle, or for positioning the device behind and also to one side of the vehicle, so that bales may be retrieved by forward motion.

8 Claims, 7 Drawing Sheets

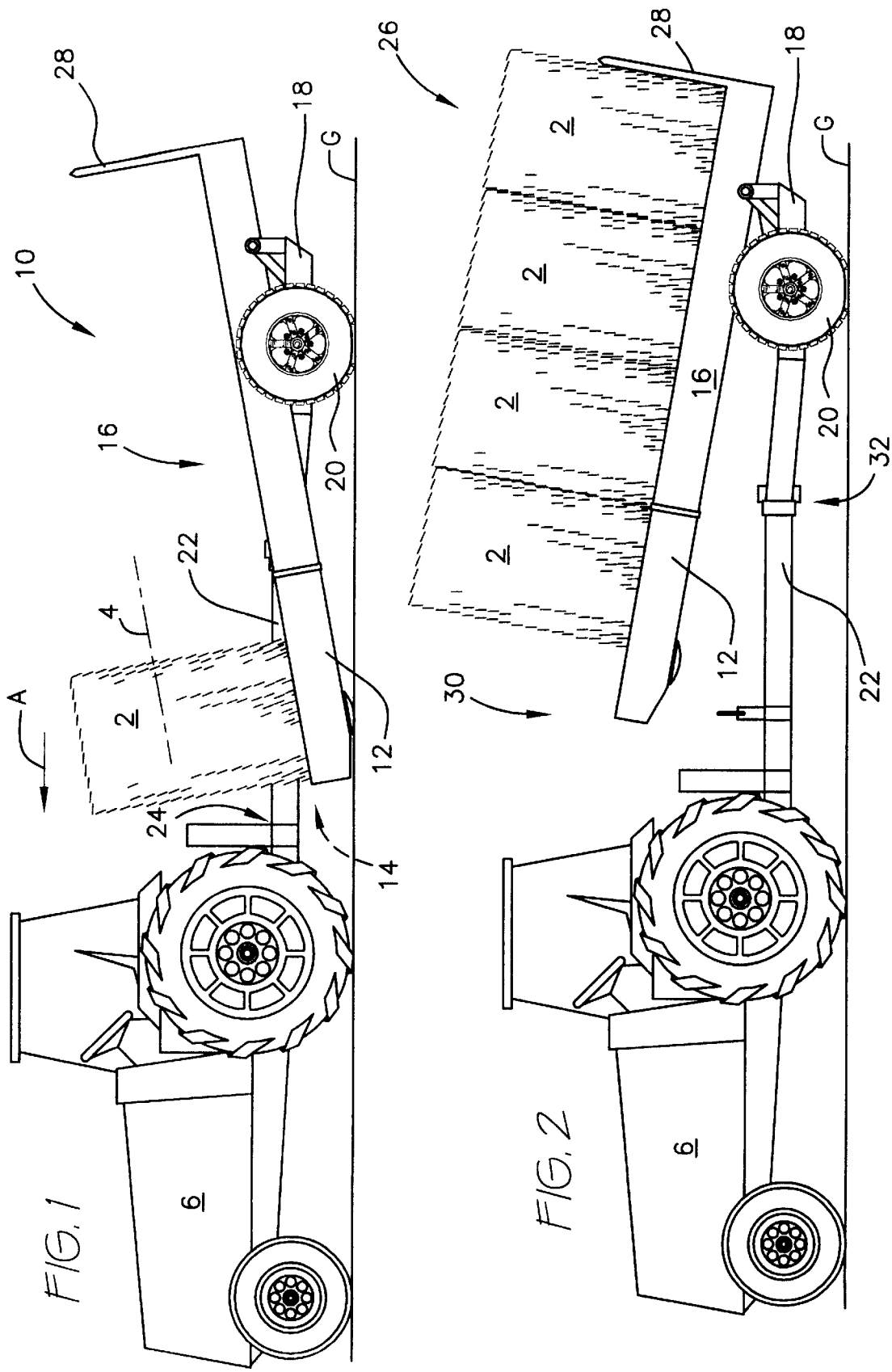

HAY BALE HANDLING DEVICE

CROSS REFERENCE TO RELATED APPLICATION

This application is related to Provisional application Ser. No. 60/033,498 filed on Dec. 19, 1996.

BACKGROUND OF THE INVENTION

1. Field of the Invention

The present invention relates to a tractor drawn, wheeled device for gathering, hauling and handling hay bales. The device comprises a chassis bearing a vee shaped trough for carrying bales, and has a two jawed scoop for gathering the bales. The trough can be inclined on the chassis to dump the bales in a vertical stack.

2. Description of the Prior Art

Machinery for cutting and baling hay has become increasingly popular. However, these machines are being designed to form ever larger and heavier bales, and leave these bales on the field at the site of cutting and forming them. It is usually necessary to transport these bales to another location. The prior art has proposed machines for lifting, transporting, and depositing bales in new locations.

U.S. Pat. No. 4,248,561, issued to Clarence C. Graves on Feb. 3, 1981, illustrates a hay bale handler which retrieves hay bales by scooping action as it is drawn by a tractor or the like. The device of Graves has two parallel rails forming a bed. These two rails are open or spread at the front of the bed, to guide bales onto the bed by funneling action. However, Graves lacks means for inclining the bed sufficiently to deposit plural hay bales in a vertical stack. Graves also lacks a backstop at the rear of the bed, so that bales can be stacked horizontally, in the manner of the present invention. The Graves device has integral fixed guides forming a funnel at the front of his bed rails. By contrast, the present invention provides pivotable mounting and powered opening or spreading of comparable guides formed at the front of the bed rails.

Backstops enabling a bale handler to deposit bales in vertical stacks are shown in U.S. Pat. No. 4,971,504, issued to Kenneth Klompien on Nov. 20, 1990. However, Klompien loads his device by a powered lift, rather than employing scooping action in the manner of the present invention. Klompien's powered lift lacks the powered, selectively opening scoop guides provided by the present invention.

None of the above inventions and patents, taken either singly or in combination, is seen to describe the instant invention as claimed.

SUMMARY OF THE INVENTION

The present invention enables a single person operating a draft vehicle, such as a tractor, to lift hay bales from a field in a single pass, transport these bales, and to unload these bales in vertical stacks of bales. This combination of abilities results in a machine which can efficiently retrieve bales from a field and store the bales efficiently and compactly in abutting vertical stacks. The invention is suited to be effective with circular hay bales, and is compatible with ordinary draft vehicles commonly utilized on farms.

The novel bale handling device comprises a wheeled chassis and a tiltable bed. The bed comprises two parallel rails having at the front two jaws which open outwardly from their respective rails to form a funnel or mouth facilitating scooping action when lifting a bale. At the rear of the bed are vertical members forming a stop for retaining bales on the bed.

The bale handling device includes an offset tow bar enabling the device to be disposed to one side of and behind the draft vehicle. This enables the operator of the draft vehicle to draw the vehicle uninterruptedly past a bale, retrieving the bale in so doing. This position affords the operator a close view of each subject bale for controlling operation. The operator lowers the forward end of the bed to the ground and spreads apart the jaws of the bed members as appropriate for the position of the bale as it sits on the ground. The jaws may be closed somewhat to assist in urging a bale onto the fixed members of the bed.

After loading a first bale, subsequent bales may be loaded by repeating the above procedure. Because the bed is sufficiently long to hold several bales, a plurality of bales can be loaded and carried in a horizontal stack. Each succeeding bale pushes previously retrieved bales to the rear, where the first bale is stopped by the vertical members attached to the bed. A plurality of bales may thus be loaded onto the device in a single pass uninterrupted by undue slowing, maneuvering, and similar impositions on forward motion.

When the device is drawn to a location where it is desired to store the bales, they may be unloaded in vertical stacks. The bed may be inclined from a horizontal orientation to just beyond a vertical orientation. Inclination is just greater than ninety degrees, so that the stack of bales is discharged from the bed by gravity. With the stops resting on the ground, the stack of bales is deposited in vertical orientation and left standing in its new location.

Thus an entire operation of retrieving, transporting, and vertically stacking round hay bales is readily performed by a single person utilizing an ordinary draft vehicle.

Accordingly, it is a principal object of the invention to provide a hay bale handling device for retrieving hay bales from a field, transporting these bales, and depositing the same in a vertical stack.

It is another object of the invention that the device be operable by a single person utilizing an ordinary draft vehicle.

It is a further object of the invention to enable operation to proceed with no undue interruption to forward motion of draft vehicle and bale handling device.

Still another object of the invention is to retrieve bales by scooping action utilizing forward motion of the device.

An additional object of the invention is that the draft vehicle pass next to a bale being retrieved.

It is again an object of the invention to provide a bed which can selectively be inclined appropriately to scoop bales lying on the ground, to transport bales with the bed elevated above the ground, and to unload bales in a vertical stack.

Yet another object of the invention is to enable selective opening of the mouth of the bed during retrieval of a bale, and closing the mouth of the bed, for assisting in retrieval and for positioning the bales during retrieval.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated when considered in conjunction with the accompanying drawings, in which like reference characters designate the same or similar parts throughout the several views, the views are abbreviated by omission of small components for clarity, and wherein:

FIGS. 1, 2, and 3 are environmental, diagrammatic, side elevational views of the invention, illustrating three possible positions of the bed of the invention, the three positions corresponding to initial engagement of a hay bale, transport of bales, and deposition of bales in a vertical stack.

DETAILED DESCRIPTION OF THE PREFERRED EMBODIMENTS

Figure 3:
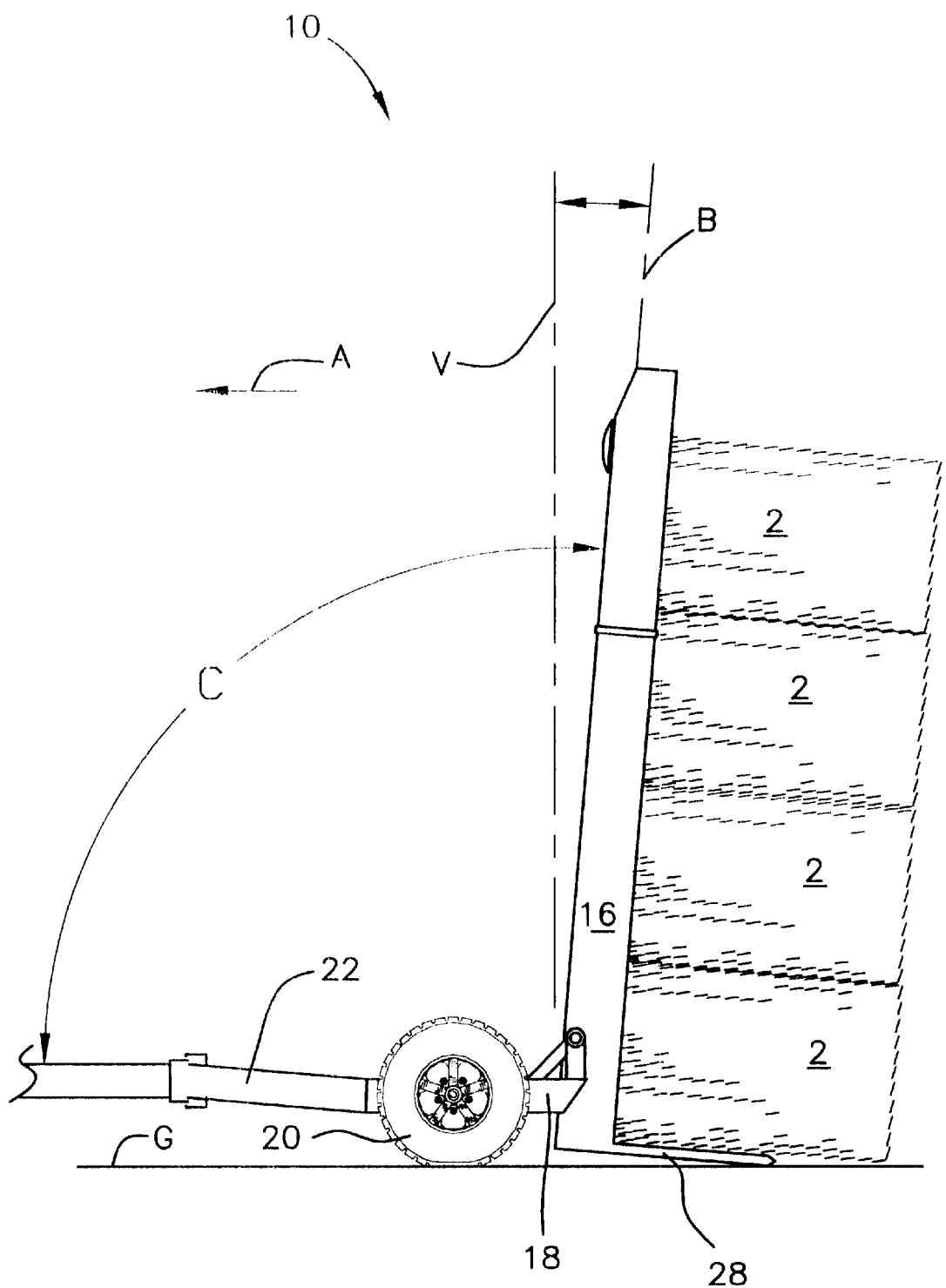

The present invention is more readily appreciated and understood when its function is described. Therefore, turning first to FIG. 1, the novel hay bale handling device 10 is seen in a first position retrieving a bale 2 of hay lying on the ground G. Only general structure of device 10 is shown in FIG. 1, many smaller details being omitted for clarity. Bale 2 is seen from the side, and is generally cylindrical, with its axis indicated at 4. Device 10 is drawn in a forward direction indicated by arrow A by a draft vehicle, such as tractor 6. As will be explained hereinafter, device 10 is drawn behind and to the left side of tractor 6. Therefore, tractor 6 has passed by bale 2, and device 10, positioned directly behind and approaching bale 2, retrieves bale 2 by scooping action.

Bale 2 is initially contacted and guided by two jaws, there being a left side jaw 12 and a corresponding right side jaw 14, the latter concealed behind bale 2 in FIG. 1. Bale 2 is guided onto a bed 16 supported on a chassis 18. Chassis 18 is supported on wheels 20 and is connected to tractor 6 by a draw bar in the form of an articulated arm 22 by any suitable conventional attachment, indicated at 24.

Several bales 2 may be retrieved and loaded onto device 10 in the manner described above. When a desired number of bales 2 is loaded onto bed 16, bed 16 is inclined in the manner illustrated in FIG. 2 by a hydraulic system which will be further described hereinafter. FIG. 2 shows a second position of bed 16 relative to chassis 18, this being a position suitable for transporting bales 2. Four bales 2 are loaded onto bed 16, and are prevented from escaping from the rear end 26 of bed 16 by a stop 28. Although the second position of bed 16 may be regarded generally as horizontal, some inclination with the front end 30 of bed 16 elevated above rear end 26 is provided to prevent escape of bales 2 to the front.

As more clearly seen in FIG. 2, a hinge joint 32 provides articulation of arm 22. Articulation of arm 22 enables tractor 6 to remain to one side of device 10, so as to be able to pass by a bale 2, as shown in FIG. 1.

Referring now to FIG. 3, when bales 2 arrive at a selected destination, they may be deposited on ground G in a vertical stack. Inclination of bed 16 extends beyond a vertical direction indicated at V from the position of FIG. 2 to a direction indicated at B. Total arcuate travel from the position of FIG. 1 to the position of FIG. 3 encompasses an obtuse angle C.

Figure 4:
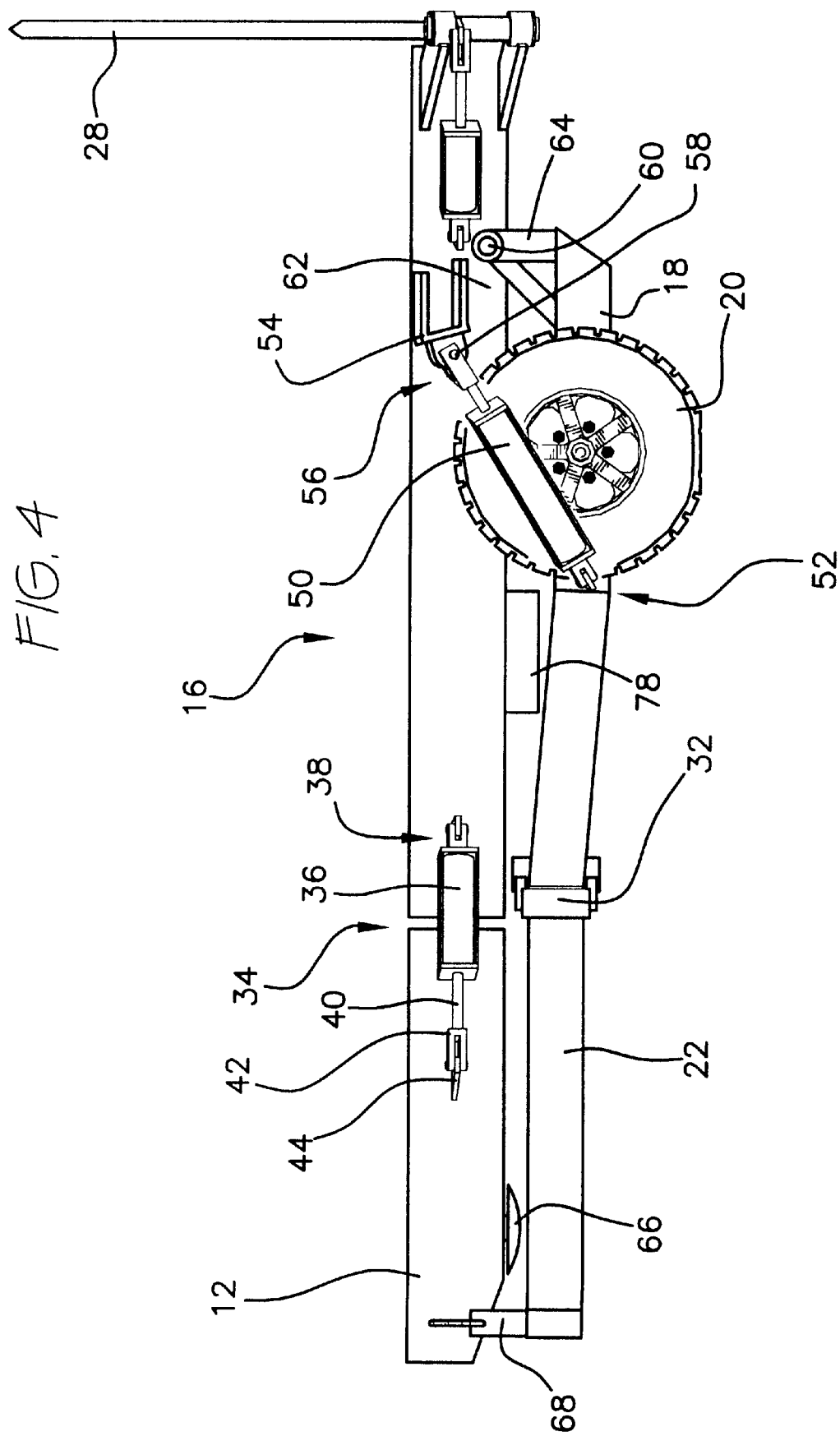
FIG. 4 is a side elevational view of the invention.

Having thus described the basic functions and abilities of device 10, construction of device 10 is described, first with reference to FIG. 4. Jaw 12 is hinged to bed 16 at 34. Opening and closing of jaw 12 is accomplished by a well known hydraulic pressure device having a piston (not separately shown) enclosed in a cylinder and acted upon by hydraulic pressure. This type of device will hereinafter be referred to as a cylinder. Cylinder 36 is pivotally anchored to bed 16 at 38, and has a projecting arm 40 terminating in a clevis 42. Clevis 42 is pivotally hinged to a solid member 44 of jaw 12.

Inclination of bed 16 is accomplished by a cylinder 50 pivotally anchored to chassis 18 at 52, and connected to a solid member 54 of bed 16 at a clevis 56. Clevis 56 is pivotally joined to member 54 by a pin 58 penetrating both legs of clevis 56 and also member 54. Bed 16 is hinged to chassis 18 at a pin 60 passing through member 62 of bed 16 and member 64 of chassis 18.

A foot 66, as seen in FIG. 4, depends from jaw 12, for supporting bed 16 from the front in addition to support at the rear from chassis 18. It is also possible to support bed 16 during transport by upwardly projecting leg 68. Leg 68 is connected to arm 22, as will be further discussed hereinafter.

Figure 5:
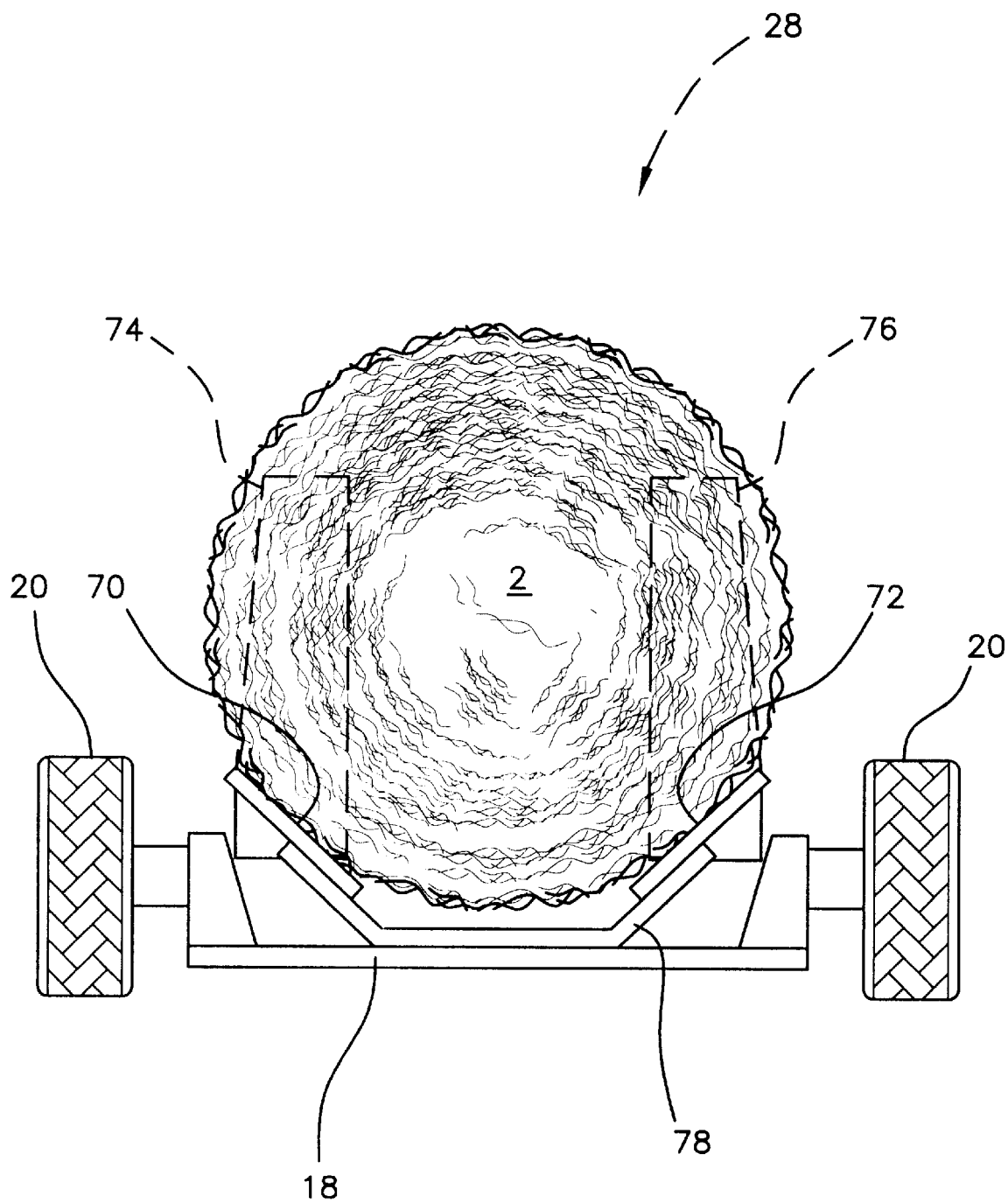
FIG. 5 is a diagrammatic, environmental front elevational view of the invention.

Referring now to FIG. 5, bed 16 is seen to comprise two longitudinally disposed walls 70, 72 inclined to combine to form a v-shaped trough. A v-shaped trough is advantageous since this configuration requires two members to provide support from below, and from right and left lateral sides. This configuration centers bales 2 between right and left sides of device 10, and also aligns bales 2 axially for stacking. Walls 70, 72 have flat, smooth inner faces (see FIG. 6), as do jaws 12, 14, so that bales 2 will slide easily thereon when loading more than one bale 2 on bed 16.

Figure 6:
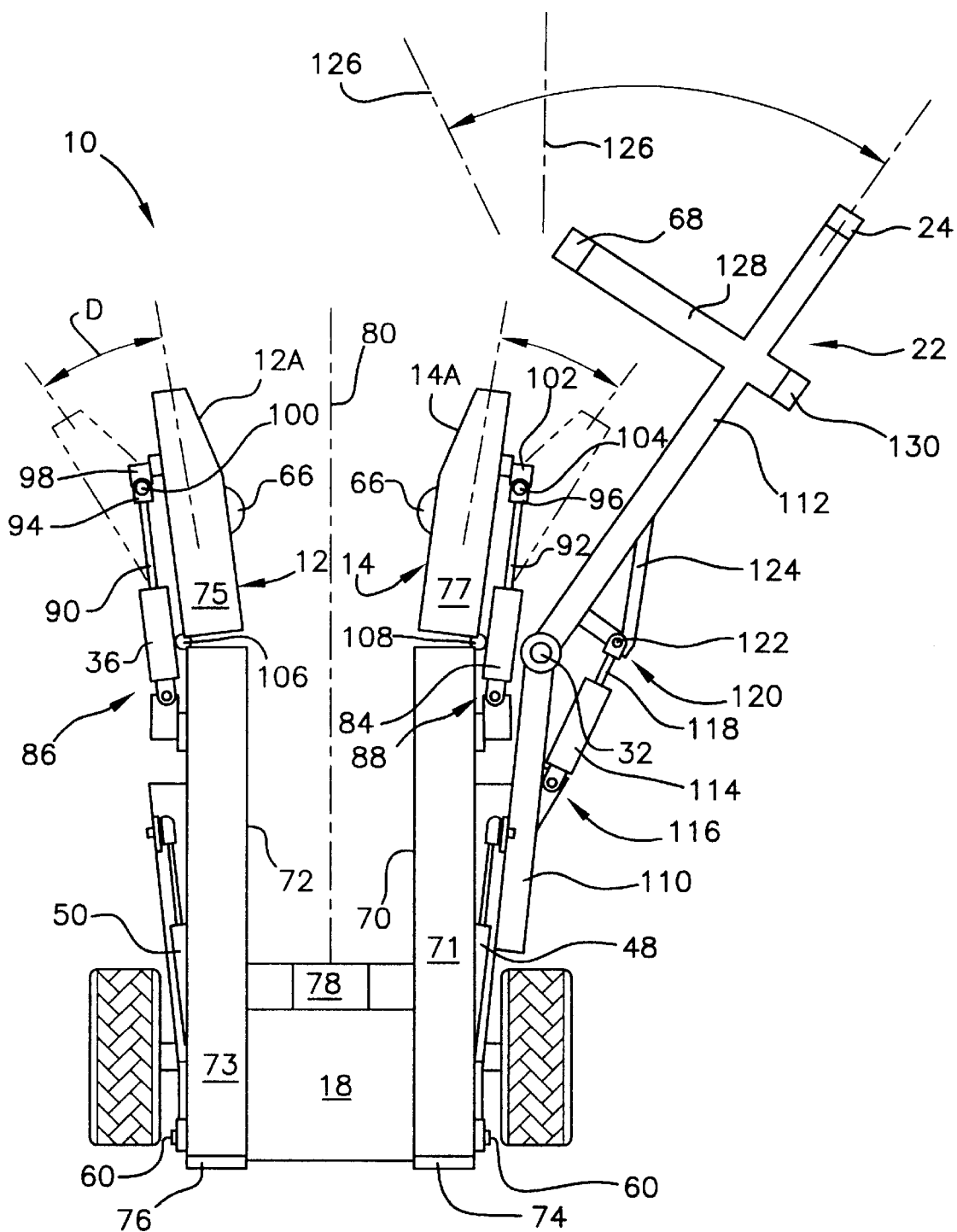
FIG. 6 is a top plan view of the invention.
Figure 8:
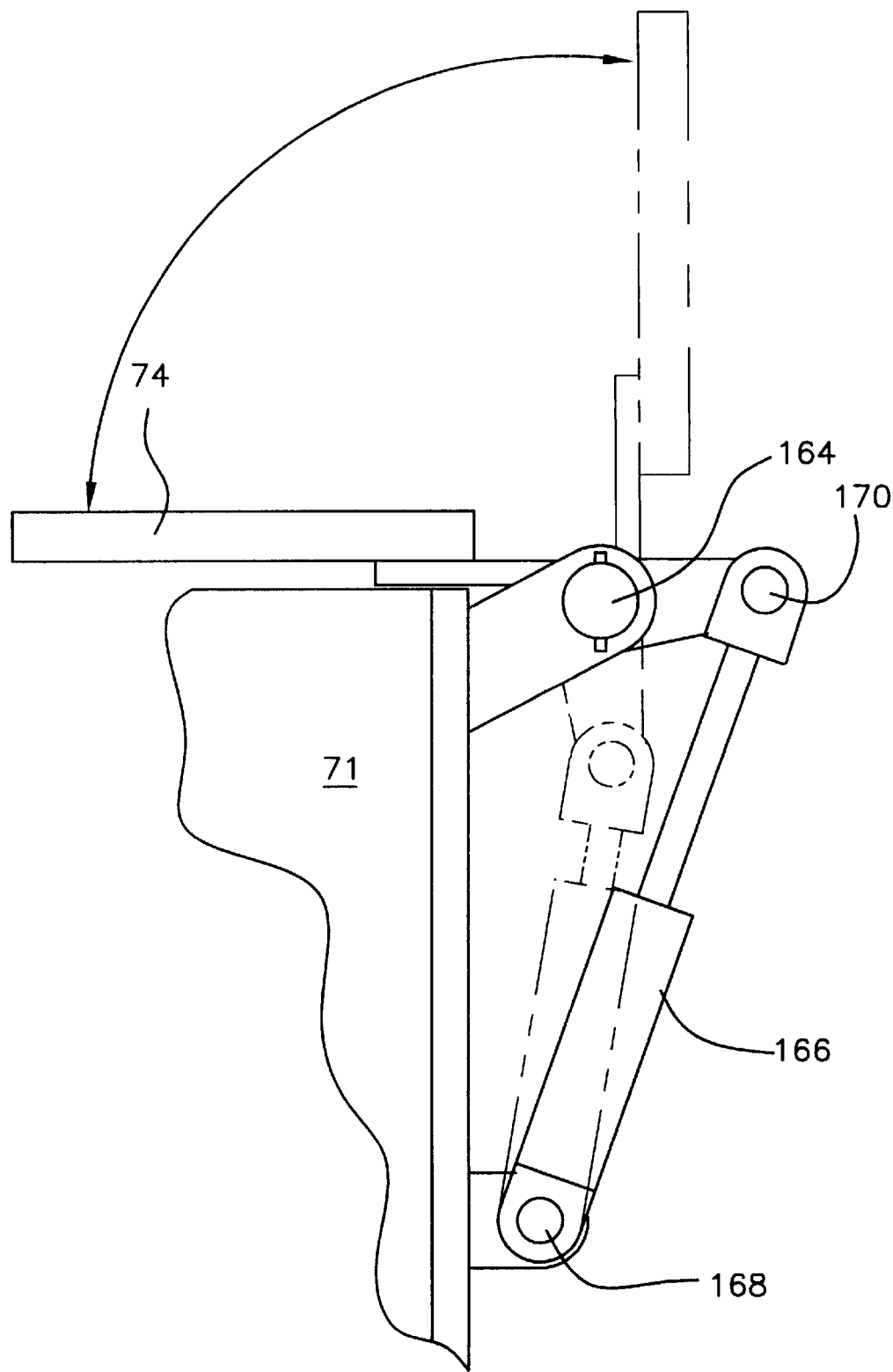
FIG. 8 is a plan detail view of the rotating vertical stop members of the present invention.

Stop 28 may be varied, as is seen in FIGS. 5, 6, and 8, to comprise upright vertical members 74, 76 respectively projecting vertically from associated walls 70, 72. It will be noted that members 74, 76 are shorter than bale 2. This enables successful stacking since when bed 16 is inclined as shown in FIG. 3, some of the bottom bale 2 will contact the ground. Inclination of bales 2 places significant weight upon the portion of bottom bale 2 contacting the ground. Therefore, when device 10 is pulled in the direction of arrow A, bales 2 remain in an aligned, vertical stack precisely where they first contact ground G.

A brace 78 spans right and left walls 70, 72 towards front end 30 of bed 16. Brace 78 rests upon, but is not fastened to, chassis 18. Corresponding connection at the rear of bed 16 is provided by structure of chassis 18 at pivot pin 54 (shown at the right of FIG. 4).

As suggested by FIG. 5, it will be apparent that much of device 10 is bilaterally symmetrical. FIG. 6 further illustrates this symmetry about longitudinal axis 80. Thus it follows that wall 70 is a mirror image of wall 72, that there are two feet 66, that jaw 12 is a mirror image of jaw 14, each jaw hinged to its associated wall 72 or 70, and that cylinder 50 has a counterpart 48 including corresponding connection at bed 16 and chassis 18.

Jaws 12, 14 are operated by cylinders 36, 84, which are pivotally anchored to respective walls 72, 70 at 86 and 88. Cylinders 36, 84 each have a respective projecting arm 40 or 92 terminating in a clevis 42 or 96. Clevis 42 engages a member 44 solidly fixed to jaw 12 by a pin 100 to effect hinged or pivotal relationship. Likewise, clevis 96 engages a member 102 by pin 104.

Cylinder 36 causes jaw 12 to open or close, as indicated by arrow D, by pivoting at a hinge 106. Jaw 14 has a corresponding hinge 108 enabling similar function as that of jaw 12. Jaws 12, 14 are depicted in their nearly closed positions in solid lines. Preferably, hinges 106, 108 are arranged to enable jaws 12, 14 to extend collinearly from their respective walls 72, 70. Open positions of jaws 12, 14 are illustrated in broken lines.

Jaws 12, 14 and respective cylinders 36, 84 may be regarded as a powered funnel connected to forward end 30 of bed 16, having two wings each pivotally mounted in symmetric opposition on bed 16. The wings are disposed to sweep through an acute angle between a normal position wherein each jaw 12 or 14, or wing, extends longitudinally forwardly from bed 16 and a spread position wherein each jaw 12 or 14, or wing, extends outwardly from bed 16.

In the embodiment depicted, each jaw 12 or 14 has an edge 12A or 14A modifying the otherwise rectangular configuration. Edges 12A, 14A enable their respective jaws 12, 14 to cooperate with ground G (see FIG. 1) when jaws 12, 14 contact ground G. This characteristic enables jaws 12, 14 to pass under a bale 2 to a significant degree during initial engagement when retrieving bales.

Walls 70, 72 and jaws 12, 14 have flat, smooth, inclined, upwardly directed faces 71, 73, 75, 77 (respectively). Smoothness enables bales 2 (see FIG. 1) to slide easily when being loaded.

In a significant departure from symmetry of device 10, it will be seen that arm 22 is disposed to the right side of chassis 18. Arm 22 comprises sections 110, 112 hinged at 32. Offset, or bending of arm 22 is provided by a cylinder 114 which is pivotally anchored to arm section 110 at 116, and has a projecting arm 118 pivotally connected at 120 by clevis 122 to a v-shaped wing 124 projecting from arm section 112.

Section 112 of arm 22 can be moved to project to the right of device 10, as shown in FIG. 6, for moving device 10 forwardly while retrieving and loading bales 2 (see FIG. 1). Alternatively, section 112 is moved to a position more in line with axis 80. The latter position is generally indicated at 126, and is utilized when transporting device 10 with bed 16 loaded.

A second brace 128 is fixed to arm section 112. Leg 68 and a corresponding leg 130 project upwardly from brace 128. Brace 128 provides support to bed 16 when bed 16 is generally horizontally disposed for transporting bales 2 (see FIG. 2).

Figure 7:
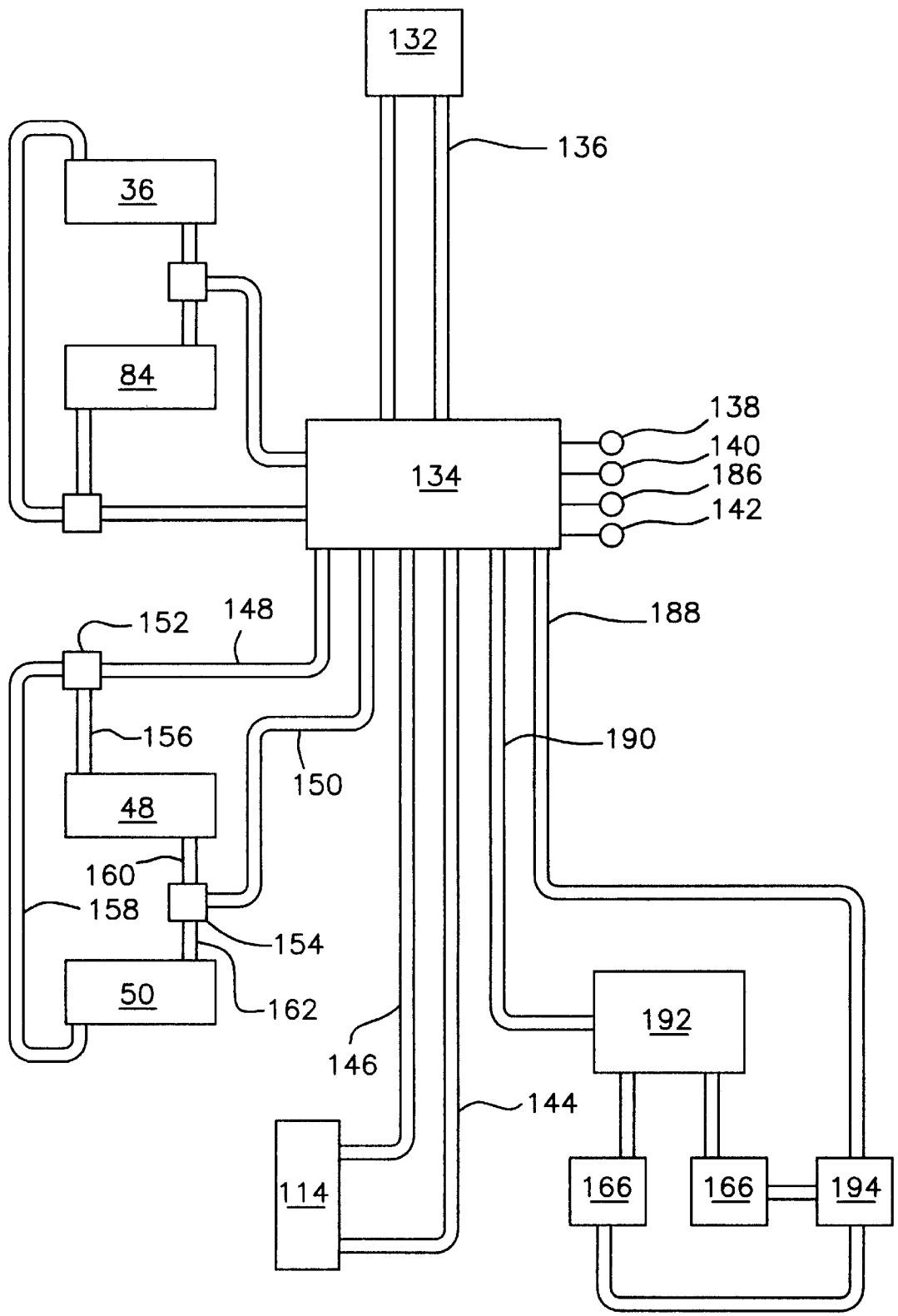
FIG. 7 is a diagrammatic view of the hydraulic system.

The various cylinders described above are incorporated into a single hydraulic system utilizing conventional components and practice. This system is shown in FIG. 7. A suitable source of hydraulic pressure, such as pump 132, is connected to power at the draft vehicle. Alternatively, a motorized pump (not shown) may be provided in self-contained form within device 10. Pressurized hydraulic fluid flows to valve manifold 134 through a conduit 136. Valve manifold 134 incorporates four separate valves (not separately shown) each controlled by a valve operator 138, 140, 142, and 186. Each valve operator 138, 140, 142, and 186 controls a separate hydraulic subcircuit.

Cylinder 114 is connected to its valve within valve manifold 134 by conduits 144, 146. Cylinders 48, 50 are served by conduits 148, 150, each of which conduit 148 or 150 branches at an equalizing valve 152 or 154. Conduits 156, 158 connect equalizing valve 152 to cylinders 48, 50, and conduits 160, 162 connect equalizing valve 154 to the other respective sides of cylinders 48, 50. Equalizing valves 152, 154 assure that associated cylinders 48, 50 operate in synchrony. Cylinders 36, 84 are served in essentially the same manner as that controlling cylinders 48, 50. Additionally, cylinders 166 are connected to valve manifold 134 by conduits 188, 190 and are controlled by the valve operator 186. Equalizing valves 192, 194 serve to operate cylinders 166 in a synchronous manner.

It will be understood that all cylinders presented herein are of the double acting type, in that the piston of each cylinder experiences pressure alternately on both sides, thereby being capable of alternately pushing or expanding, and pulling or contracting. In other respects, the hydraulic system may follow conventional practice, and may include filters and other accessories (none shown) normally recommended in pressurized hydraulic systems.

Another feature of the present invention is that the vertical stop members 74 and 76 can be rotated so that the bales 2 could be slid off the bed members 71 and 73. This feature is best seen in FIG. 8, with one of the pivot control hydraulic cylinders 166 being shown in its fully extended position between pivots 168 and 170. This rotates vertical stop member 74 above pivot 164 such that the bales 2 are prevented from sliding off rearwardly. When pivot control hydraulic cylinder 166 is fully retracted, as seen in the broken lines in FIG. 8, vertical stop member 74 is rotated about pivot 164 into a position that would allow the bales 2 to slide freely off the back of the bed 16. Thus, transport of bales that do not need to be stacked is accomplished without stopping the tractor or draft vehicle 6.

The present invention is susceptible to many modifications and variations which may be introduced by those of skill in the art. For example, arm 22 may be located on either the right or left side of device 10. Also, arm 22 may be modified to project upwardly and descend into the bed of a pickup truck (not shown) utilized as a draft vehicle. Still other variations may be made to the chassis, wheel arrangement, draw bar arrangement, support of the bed, and hydraulic system without departing from the spirit of the invention.

It will further be understood that handling of hay bales is only one contemplated application of the invention. Lifting, transporting, and stacking of other objects is within the scope of the invention.

It is to be understood that the present invention is not limited to the embodiments described above, but encompasses any and all embodiments within the scope of the following claims.

I claim:

1. A bale handling device for retrieving bales from a field, transporting the bales, and stacking the bales in a new location, said bale handling device comprising:

a chassis having a plurality of wheels;

a bed having retaining means for supporting bales on said bed from below the bales, and for preventing bales from rolling laterally off said bed, said bed having a forward end and a rear end, and pin means for supporting said bed for pivoting movement in a vertical plane on said chassis; and powered inclining means for selectively inclining said bed on said chassis about said pin means to a first position wherein said forward end of said bed is lowered to the ground, a second position wherein said bed is rotated about said pin means and elevated above and disposed generally horizontally to the ground, and a third position wherein said bed is rotated about said pin means until said rear end of said bed contacts the ground and said bed is generally vertical, whereby a stack of bales resting on said bed is deposited in vertical orientation on the ground.

2. The bale handling device according to claim 1, said bed further comprising a stop disposed at said rear end of said bed, for preventing bales from falling off said bed at said rear end thereof.

3. The bale handling device according to claim 1, further comprising a draw bar having offset positioning means for enabling said bale handling device to be towed selectively behind and simultaneously to one side of a draft vehicle and directly behind the draft vehicle, whereby said bale handling device can selectively be easily towed during transport and can encounter and retrieve a bale while continuously moving only forwardly during retrieval.

4. The bale handling device according to claim 3, further comprising power means for operating said offset positioning means to move said bale handling device selectively directly to a first draft position behind the draft vehicle and to a second draft position simultaneously behind and to one side of the draft vehicle.

5. A bale handling device for retrieving bales from a field, transporting the bales, and stacking the bales in a new location, said bale handling device comprising:

a chassis having a plurality of wheels;

a bed having retaining means for supporting bales on said bed from below the bales, and for preventing bales from rolling laterally off said bed, said bed having a forward end and a rear end, and means for supporting said bed on said chassis; and powered inclining means for selectively inclining said bed on said chassis to a first position wherein said forward end of said bed is lowered to the ground, a second position wherein said bed is elevated above and disposed generally horizontally to the ground, and a third position wherein said rear end of said bed contacts the ground and said bed is generally vertical, whereby a stack of bales resting on said bed is deposited in vertical orientation on the ground, said retaining means of said bed comprising two bed members forming a vee shaped trough, whereby bales are restrained from rolling laterally of said bed by only two members, and whereby bales are axially aligned upon being loaded onto and supported by said bed.

6. The bale handling device according to claim 5, said stop further comprising two stop members each disposed adjacent and at a right angle to an associated one of said two bed members, means for pivotally mounting each said stop member on said bed, and power means for pivoting each said stop member.

7. The bale handling device according to claim 5, said bed further comprising powered funnel means connected to said forward end of said bed, further comprising two wings each pivotally mounted in symmetric opposition on said bed and disposed to sweep through an acute angle between a normal position wherein each said wing extends longitudinally from said bed and a spread position wherein each said wing extends outwardly from said bed, whereby said funnel means assists in retrieving a bale from the ground and loading the bale onto said bed.

8. A bale handling device for retrieving bales from a field, transporting the bales, and stacking the bales in a new location, said bale handling device comprising:

a chassis having a plurality of wheels;

a bed having
      a forward end and a rear end,
      means for supporting said bed on said chassis, two bed members forming a vee shaped trough, whereby bales are restrained from rolling laterally off said bed by only two members, and whereby bales are axially aligned upon being loaded onto and supported by said bed, a stop disposed at said rear end of said bed, for preventing bales from falling off said bed at said rear end thereof, said stop further comprising two stop members each disposed adjacent and at a right angle to an associated one of said two bed members, and means for pivotally mounting each said stop member on said bed, power means for pivoting each said stop member relative to its associated said bed member, powered funnel means connected to said forward end of said bed, further comprising two wings each pivotally mounted in symmetric opposition on said bed and disposed to sweep through an acute angle between a normal position wherein each said wing extends longitudinally from said bed and a spread position wherein each said wing extends outwardly from said bed, whereby said funnel means assists in retrieving a bale from the ground and loading the bale onto said bed;

powered inclining power means for selectively inclining said bed on said chassis to a first position wherein said forward end of said bed is lowered to the ground, a second position wherein said bed is elevated above and disposed generally horizontally to the ground, and a third position wherein said rear end of said bed contacts the ground and said bed is generally vertical, whereby a stack of bales resting on said bed is deposited in vertical orientation on the ground; and a draw bar having offset positioning means for enabling said bale handling device to be towed selectively behind and simultaneously to one side of a draft vehicle and directly behind the draft vehicle, whereby said bale handling device can selectively be easily towed during transport and can encounter and retrieve a bale while continuously moving only forwardly during retrieval, and draw bar power means for operating said offset positioning means to move said bale handling device selectively directly to a first draft position behind the draft vehicle and to a second draft position simultaneously behind and to one side of the draft vehicle.

* * * * *